June 9, 1964     JUZO HINO     3,136,219
TWO-WAY CUTTING DEVICES FOR PLANERS
Filed March 12, 1963
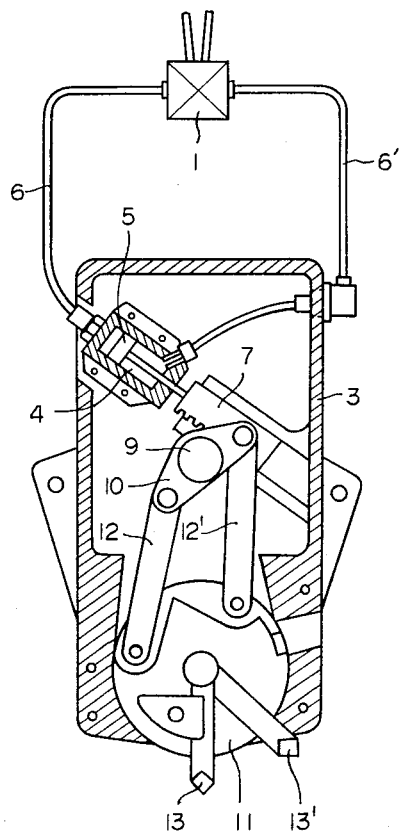
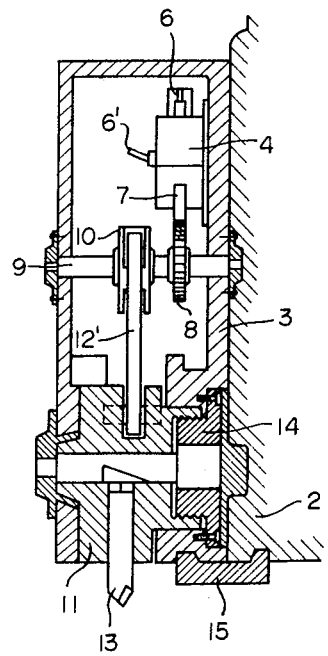
Inventor
Juzo Hino
By Stevens, Davis, Miller & Mosher
Attorneys

United States Patent Office 3,136,219
Patented June 9, 1964

3,136,219
TWO-WAY CUTTING DEVICES FOR PLANERS
Juzo Hino, Akashi-shi, Japan, assignor to The Kinoshita Iron Works, Ltd., Akashi-shi, Japan, a corporation of Japan
Filed Mar. 12, 1963, Ser. No. 264,492
Claims priority, application Japan Oct. 31, 1962
1 Claim. (Cl. 90—53)

The present invention relates to two-way cutting devices for planers.

For obtaining an improved cutting efficiency with planers, efforts have been made heretofore to maximize the cutting speed and the table speed on its return stroke with considerable success. At present, however, an increasing interest is being taken in the so-called two-way cutting system in which work is done on both forward and return strokes of the table with no customary non-cutting return stroke included.

Various devices of the system have previously been proposed but only with a poor mechanical accuracy and all of them can barely serve the intended purpose particularly in production due to lack of solidity or rigidity of the tool suporting and changing mechanisms, which are invariably subject to heavy cutting resistances in operation.

In fact, they have been a mere ornament to the machine and no real two-way cutting device has ever been proposed.

The present invention has for its object to provide a two-way cutting device which is partically usable having highly improved rigidity and production accuracy.

According to the present invention, a two-way cutting device for a planer comprising an oil hydraulic pump operable in association with the reciprocation of the table of the planer, a casing adapted to be secured to the saddle of the planer and serving also as a tool rest, a piston arranged in said casing to effect regular reciprocatory movement under the control of said oil hydraulic pump, a crankshaft journaled in said casing, a rockable crank mounted on said crankshaft, a rack-and-pinion arrangement for transmitting the reciprocatory movement of said piston to said rockable crank to impart a regular rocking movement thereto, a disc arranged on a horizontal axis for vertical rotation and carrying a pair of planer tools, a pair of links inter-connecting said crank and disc for transforming the rocking movement of said crank into a regular reciprocal rotation of said disc effective to alternately place the tools in a vertical cutting position, said links being arranged to be positioned closest to either dead center of said crank when either of the tools is in the cutting position, an externally threaded bearing member secured to said tool rest and threadably engaging with the rear end of said vertically rotatable disc, said threadable engagement being such that it is tightened upon rotation of said disc preparatory for the return cutting stroke and loosened upon rotation of said disc for the forward cutting stroke, and a clamp of U-shaped cross section for joining together said tool rest and the saddle of the planer.

The foregoing and other objects, features and advantages will become apparent from the following description when taken in conjunction with the accompanying drawing, in which:

FIG. 1 is a front elevation, partly in section, of one embodiment of the invention; and FIG. 2 is a side elevation, partly in section of same.

Referring to the drawing, the two-way cutting device illustrated includes a casing 3 as a tool rest secured to the front face of the saddle 2 of the machine and in which a piston-cylinder assembly 4–5 is mounted. An oil hydraulic pump 1 is connected with the opposite ends of the cylinder 4 by way of oil pipes 6 and 6'. The piston 5 is integral with a rod extending through one end wall of the cylinder and carrying a rack 7 at the outer end. A pinion 8 is mounted fast on a crankshaft 9 journaled at opposite ends in the walls of the casing 3 and is held in meshing engagement with the rack 7. The crankshaft 9 has a crank 10 including two opposite arms.

A tool holder 11 takes the form of a generally circular disc mounted in the casing 3 on a horizontal axis extending at right angles to the front and rear walls thereof and thus is rotatable in a vertical plane. A pair of links 12 and 12' interconnect the tool holder disc 11 and the respective arms of the crank 10, as illustrated. Reference numerals 13 and 13' indicate a pair of planer tools secured in the tool holder disc 11 and extending radially outwardly from its axis. The rear wall of the casing 3 is formed with a counterbored aperture in which an externally threaded bearing member 14 is secured with its flange fixed to the annular shoulder of the aperture. The member 14 is threaded in the rear end of the tool holder disc 11. A clamp 15 is U-shaped in cross section and serves to join together the saddle 2 and the tool rest 3, as shown in FIG. 2.

It is to be understood that the oil pump 1 is operable in association with the feed change or reciprocation of the planar table so as to feed the cylinder 4 alternately by way of oil pipes 6 and 6' to regularly move the piston 5 back and forth in the cylinder.

In operation, the movement of the piston 5 is transmitted through rack 7, pinion 8, crankshaft 9, crank 10 and links 12, 12' to the tool holder disc 11 so that each time the table movement is reversed the tool holder disc is regularly rotated forwardly or backwardly through a predetermined angle to assume one of its extreme positions. It is to be understood that in each of the extreme positions of the tool holder disc one of the planer tools 13 and 13' is in its vertical or cutting position while the other planer tool is in its raised or inoperative position. It is also to be understood that the connecting links 12, 12' and associated parts are arranged so that on either stroke of the planer table the links 12 and 12' are in their extreme position closest to either one of the dead centers of the crank 10 and thus most effective to sustain not only that component of the cutting stress acting upon the planer tool in cutting position to urge the latter upwardly, but also the stress component acting transversely upon the tool. The two-point supporting arrangement of the links 12 and 12' with respect to the tool holder disc evidently helps sustain the transverse stress component acting upon the planer tool in vertical position.

As will be apparent, the major component of the cutting stress acting upon the tool is in the cutting direction and acts on the usual cutting stroke of the table to press the tool holder disc 11 and tool rest 3 against the saddle 2 of the planer but on the return stroke it acts in a direction to separate the disc 11 away from the saddle. This has been one of difficulties encountered with previous two-way cutting devices. This difficulty is effectively overcome in this embodiment by use of the clamp 15 of U-shaped cross section, provided to join together the saddle 2 and tool rest 3 as described hereinbefore. In addition to this, the externally threaded bearing member 14 with its flange fixed to the tool rest 3 is effective to prevent any forward displacement of the tool holder disc 11, in which the member is threaded. Furthermore, the threadable engagement of the bearing member 14 with the tool holder disc is such that when the table movement is reversed for return stroke the engagement is tightened by the rotation of the tool holder disc to further ensure the retainment of the latter. The threadable engagement is loosened to some extent for the normal forward cutting, but this has been found to have no adverse effects upon the cutting efficiency during the forward cutting stroke.

As described hereinbefore, the device of the invention includes a vertically rotatable disc carrying a pair of planer tools which is not only horizontally journaled in the tool rest but also is threadably fitted over a bearing member integrally secured to the tool rest.

It will be appreciated that such tool supporting mechanism may be made extraordinarily sturdy in structure and makes it possible to change tools smoothly simply by rotating the tool holder disc in a vertical plane. Further, the disc is supported rotatable under the control of a crank and a pair of links which are arranged relative to each other so that with either of the planer tools in cutting position the links are positioned closest to either dead center of the crank. With this arrangement, the upward and transverse components of the cutting stress acting upon the planer tool on either stroke of the table are effectively sustained by the crank and link arrangement so that any stress possibly acting upon the rack-and-pinion transmission gearing and the hydraulic piston is minimized. It will readily be appreciated that the two-way cutting device constructed and arranged in this manner offers markedly improved mechanical accuracy and rigidity compared with previously known devices.

Moreover, the threadable engagement of the bearing member secured to the tool rest with the tool holder disc is effective to further ensure the retainment of the latter and thereby to prevent any decline in mechanical accuracy of the device. Particularly, the fact that upon reversal of the table movement for its return stroke, the above threadable engagement is tightened to effectively resist that component of the cutting stress tending to move the vertically rotatable tool holding disc away from the saddle to which the tool rest is secured, cooperates with the clamp of U-shaped cross section to solidify the assemblage of the tool holding disc, tool rest and saddle. With this device, therefore, the difficulty encountered with previous devices in respect to the reverse cutting is fully overcome.

From the foregoing, it will be appreciated that with the device of the present invention the horizontal, vertical and transverse components of the cutting stress are each sustained most effectively and thus the device is free from any structural strain in operation affording substantial strength and production far exceeding those of previous devices. It should be recognized that the present invention has provided for the first time a two-way cutting device which is usable in production and effective to markedly improve the cutting efficiency of the planer.

While but one embodiment of the invention has been shown and described herein, it will be evident that various changes in the construction and arrangement of parts may be made within the scope of the invention as defined in the appended claim.

What is claimed is:

A two-way cutting device for a planer comprising an oil hydraulic pump operable in association with the reciprocation of the table of the planer, a casing adapted to be secured to the saddle of the planer and serving also a a tool rest, a piston arranged in said casing to effect regular reciprocatory movement under the control of said oil hydraulic pump, a crankshaft journaled in said casing, a rockable crank mounted on said crankshaft, a rack-and-pinion arrangement for transmitting the reciprocatory movement of said piston to said rockable crank to impart a regular rocking movement thereto, a disc arranged on a horizontal axis for vertical rotation and carrying a pair of planer tools, a pair of links interconnecting said crank and disc for transforming the rocking movement of said crank into a regular reciprocal rotation of said disc effective to alternately place the tools in a vertical cutting position, said links being arranged to be positioned closest to either dead center of said crank when either of the tools is in the cutting position, an externally threaded bearing member secured to said tool rest and threadably engaging with the rear end of said vertically rotatable disc, said threadable engagement being such that it is tightened upon rotation of said disc preparatory for the return cutting stroke and loosened upon rotation of said disc for the forward cutting stroke, and a clamp of U-shaped cross section for joining together said tool rest and the saddle of the planer.

No references cited.